(12) United States Patent
Merz

(10) Patent No.: US 7,055,644 B2
(45) Date of Patent: Jun. 6, 2006

(54) POWER STEERING SYSTEM WITH HYDRAULIC POWER ASSISTANCE

(75) Inventor: Johann Merz, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 10/926,637

(22) Filed: Aug. 26, 2004

(65) Prior Publication Data

US 2005/0051378 A1   Mar. 10, 2005

Related U.S. Application Data

(63) Continuation of application No. PCT/EP03/02585, filed on Mar. 13, 2003.

(30) Foreign Application Priority Data

Mar. 15, 2002   (DE) ................ 102 11 396

(51) Int. Cl.
*B62D 5/06*   (2006.01)
(52) U.S. Cl. ............... 180/428; 180/417; 180/441; 180/434; 180/439; 180/402; 180/403
(58) Field of Classification Search ......... 180/428, 180/417, 441, 434, 439, 402, 403
See application file for complete search history.

(56) References Cited

U.S. PATENT DOCUMENTS

| 5,449,186 | A | * | 9/1995 | Gerl et al. .............. 180/404 |
| 5,553,683 | A | * | 9/1996 | Wenzel et al. ........... 180/417 |
| 5,950,757 | A | * | 9/1999 | Saita et al. ............. 180/404 |
| 6,047,788 | A | * | 4/2000 | Bohner et al. .......... 180/406 |
| 6,076,627 | A | * | 6/2000 | Bohner et al. .......... 180/422 |
| 6,213,246 | B1 | * | 4/2001 | Bohner et al. .......... 180/403 |
| 6,474,437 | B1 |   | 11/2002 | Elser et al. |

FOREIGN PATENT DOCUMENTS

| DE | 197 52 397 |   | 6/1998 |
| DE | 19752397 A1 | * | 6/1998 |
| DE | 198 29 531 |   | 1/2000 |
| EP | 0 440 638 |   | 8/1991 |
| GB | 2 305 898 |   | 4/1997 |
| GB | 2305898 A | * | 4/1997 |

* cited by examiner

*Primary Examiner*—Lesley D. Morris
*Assistant Examiner*—Marlon Arce-Diaz
(74) *Attorney, Agent, or Firm*—Jordan and Hamburg LLP

(57) ABSTRACT

A hydraulic power-assisted steering system, in particular for motor vehicles, has a hydraulic pump for generating hydraulic pressure for assisting the steering and an electromagnetic valve, in addition to a motor for driving the hydraulic pump. The hydraulic pump can be decoupled from the motor by a coupling.

2 Claims, 2 Drawing Sheets

POWER STEERING SYSTEM WITH HYDRAULIC POWER ASSISTANCE

Figure 1:
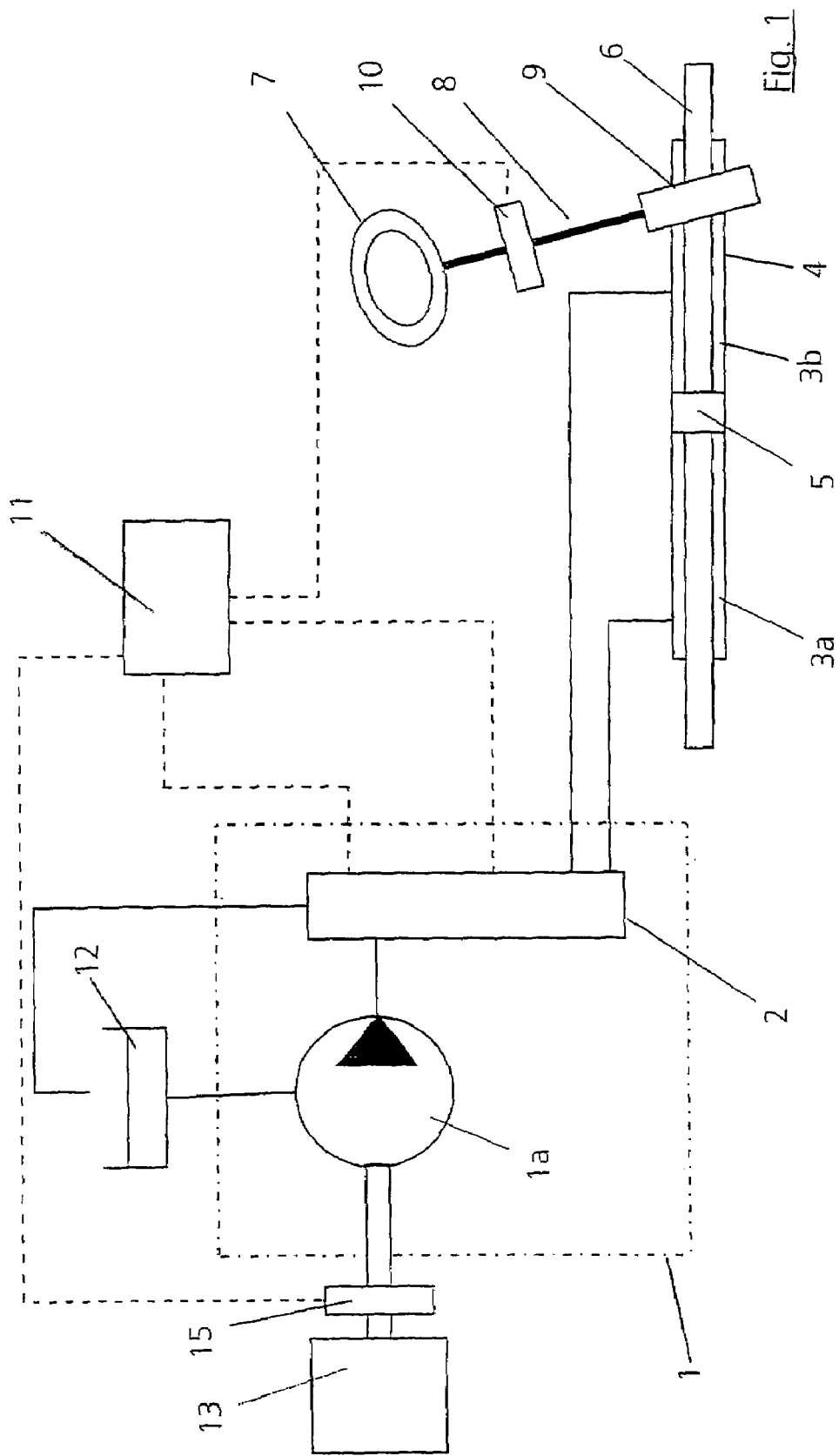

This is a Continuation, of application Ser. No. PCT/EP03/02585 filed Mar. 13, 2003.

BACKGROUND OF THE INVENTION

The invention relates to a power steering system with hydraulic power assistance, in particular for motor vehicles, having a pressure medium pump for producing a hydraulic pressure.

A generic power steering system is known from DE 198 29 531 A1.

Furthermore, reference is made to DE 197 52 397 A1 for the further prior art.

The generic document shows a power steering system with hydraulic power assistance for motor vehicles, a steering spindle which is provided with a steering handle being connected to an input element of a steering mechanism. An output element of the steering mechanism is connected to wheels, to be steered, of the motor vehicle. Pressure medium is applied to two working spaces of a servomotor of a power assistance device by a booster pump via a steering valve in a manner corresponding to a prevailing torque in the region of the steering spindle/input element. The booster pump or the pressure medium pump is driven hereby the internal combustion engine.

According to the generic document, two sensors for sensing a rotary angle and a torque are arranged on the steering spindle or on the output element of the steering mechanism. Both the magnitude and the direction of the hydraulic power assistance and the centering of the wheels to be steered are controlled via a common, electronically controlled solenoid valve. There is a torque sensor to sense the steering force.

The generic power steering system represents a development of the previously disclosed power steering systems, as disclosed, for example, in EP 0 440 638 B1.

Power assistance using simple means is possible as a result of the generic power steering system. Furthermore, the steering precision is improved.

SUMMARY OF THE INVENTION

An object of the present invention is to improve the known power steering systems further, in particular to provide further optimization with regard to energetically advantageous functioning.

Since it is possible to separate the pressure medium pump from the motor/engine by means of a clutch, it is possible to separate the pressure medium pump from the motor/engine in certain driving situations in an energetically favorable manner. It has been proven here in tests that both the $CO_2$ emissions and the fuel consumption are reduced. Separation is advantageously possible if no steering movement takes place, that is to say when no hydraulic assistance is required. This may be the case, for example, on straight parts of highways or the like.

As has been proven in tests, separating the pressure medium pump from the motor/engine noticeably reduces the overall consumption, in particular in the case of large volume pressure medium pumps.

Short line lengths and a resulting low hydraulic resistance can advantageously be attained as a result of the fact that the solenoid valve is integrated in the pressure medium pump. The energetic advantages which result as a consequence of this have an advantageous effect on the power steering system. As a result, it is in particular also possible to cost-effectively design directly involved elements to be likewise optimized and adapted thereto. As has been proven in tests, it is possible to integrate the solenoid valve into the pressure medium pump simply and inexpensively. As the apparatus according to the invention is a mass produced part, measures to reduce the cost are of not inconsiderable significance.

In comparison with previously disclosed power steering systems with hydraulic power assistance, the solution according to the invention can be produced substantially more cheaply with less mechanical complexity. Noise which occurs and may penetrate the vehicle interior is considerably reduced or eliminated.

As has likewise emerged in tests, the steering feel and the steering precision are improved by integrating the solenoid valve into the pressure medium pump. The overall size, which is of considerable significance, in particular when used in motor vehicles, is advantageously reduced considerably.

It is advantageous if the clutch is configured as an electromagnetic clutch.

In a refinement of this type, the clutch can react to changes quickly and dynamically, and can therefore be used in a flexible manner.

Furthermore, there may be provision according to the invention for the clutch to be integrated in the pressure medium pump or arranged on the pressure medium pump.

Arranging the clutch on the pressure medium pump or integrating it into the pressure medium pump makes a compact and inexpensive implement refinement possible. The necessary connection parts are reduced to a minimum and the structural measures are thus optimized.

According to the invention, there may be provision for it to be possible to control the solenoid valve via a computing unit, the computing unit processing signals from at least one steering moment sensor and, in order to control the solenoid valve, the computing unit likewise processing the booster oil pressure to the working spaces.

The computing unit controls the solenoid valve using the signals of the steering moment sensor, that is to say using the steering wish specified by the driver, and the booster oil pressure to the working spaces, with the result that the desired hydraulic assistance is produced. Any steering moment specified via the steering handle can, thus be assigned hydraulic assistance in a simple manner. Here, the prevailing booster oil pressure is taken into account appropriately.

It is also possible to control the solenoid valve in a simple manner via the computing unit as a function of additional parameters, such as, for example, the driving speed of the vehicle, the steering speed, the yaw velocity, the loading state, the engine speed, the ESP or ABS signals, the steering angle or further driver-specific settings.

As a result of suitable programming of the computing unit and appropriate sensors, it is possible to control the solenoid valve using signals which provide information about the current position of the vehicle and about desired future positions. The option for automatic steering is thus contained in the power steering system.

The steering moment sensor can be configured expediently as a pressure force sensor or as a piezoelectric element. The control path can be reduced to 0° to 0.1° using elements of this type.

Advantageous refinements of the invention emerge further from the claims and from the exemplary embodiment shown in the following text in principle using the accompanying drawings.

Figure 2:
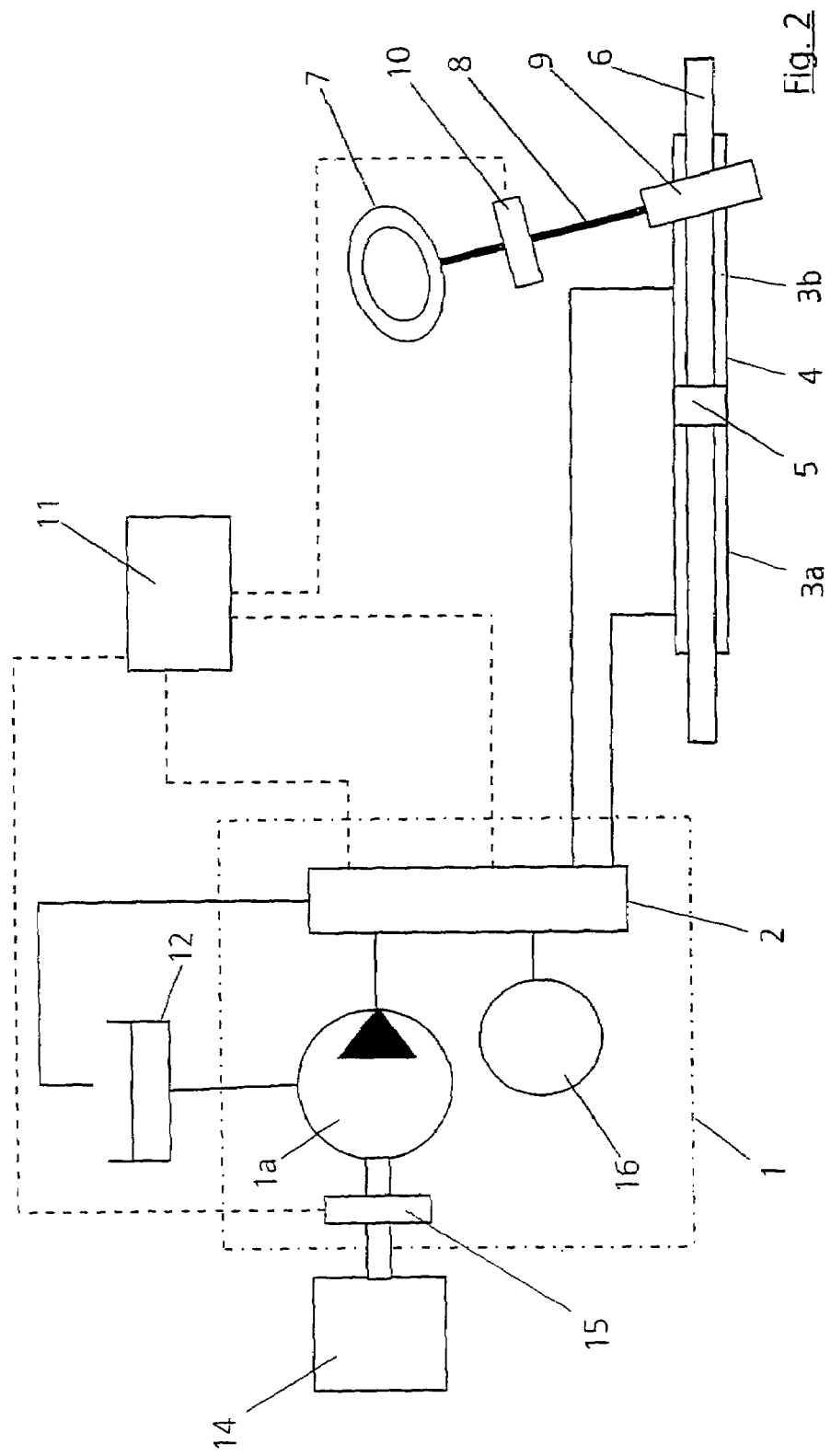

IN THE DRAWINGS:

FIG. 1 shows an outline representation of a power steering system according to the invention in a first refinement having a clutch arranged separately from the pressure medium pump and a solenoid valve with an open center; and FIG. 2 shows an outline representation of a power steering system according to the invention in a second refinement having a clutch integrated in the pressure medium pump and a solenoid valve with a closed center.

DESCRIPTION OF THE PREFERRED EMBODIMENTS

Power steering, systems with hydraulic assistance have already been disclosed sufficiently, reference being made to DE 198 29 531 A1, for which reason, in the following text, further details are given only of the features which are relevant according to the invention.

FIG. 1 and FIG. 2 show a power steering system for motor vehicles having a pressure medium pump 1 into which a solenoid valve 2 is integrated. The pressure medium pump 1 therefore has, in addition to the customary pressure medium pump device 1a, a solenoid valve 2 which is configured as a proportional solenoid valve in the exemplary embodiment shown.

The pressure medium pump 1 having the integrated solenoid valve 2 controls a pressure medium flow to two working spaces 3a, 3b. Here, the working spaces 3a, 3b can be formed in a known manner by a housing 4, in which a working piston 5 is arranged which separates the working spaces 3a, 3b from one another. Here, the working piston 5 is generally connected to a rack 6. Here, a steering request which is specified by the driver by means of a steering handle 7 acts via a steering spindle 8 on a drive pinion 9 which is operatively connected to the rack 6. The steering wish which is specified by the driver by means of the steering handle 7 is sensed by a steering moment sensor 10 and transmitted to a computing unit 11. In order to control the solenoid valve 2, the computing unit 11 also takes into account or processes the booster oil pressure to the working spaces 3a and 3b. The solenoid valve 2 is therefore actuated using the steering moment determined and the booster oil pressure. An advantageous steering sensation results from the fact that the booster oil pressure is also sensed and taken into account.

In the exemplary embodiment shown in FIG. 1, the booster oil pressure corresponds to the pump pressure. In the exemplary embodiment shown in FIG. 2. which shows a solenoid valve 2 with a closed center, the pump pressure may be different than the booster oil pressure to the working spaces 3a, 3b. The control of the solenoid valve 2 by appropriate signals of the computing unit 11 and the sensing of the booster oil pressure are clarified in the two exemplary embodiments, in each case by two dashed lines. The connection or the signal transmission from the steering moment sensor 10 to the computing unit 11 is likewise symbolized in the two exemplary embodiments by a dashed line.

The computing unit 11 is supplied with additional parameters by means of a CAN bus (not shown). Moreover, in order to control the solenoid valve 2, the computing unit 11 can process additional parameters, such as the vehicle speed, the steering speed, accelerations, the yaw velocity, the loading state, the engine speed, ESP signals, ABS signals, the steering angle and driver-specific settings. The computing unit 11 controls the solenoid valve 2 using these parameters and the signals of the steering moment sensor 10 which can advantageously be configured as a piezoelectric element.

Alternatively, it is also possible for the steering moment sensor 10 to be configured as a steering moment and angle sensor or to be a torque sensor.

The solenoid valve 2 controls the pressure medium flow to the working spaces 3a and 3b using the signals of the computing unit 11 in such a way that the steering request which is specified, by the driver by means of the steering handle 7 is hydraulically assisted. The pressure medium pump 1 is connected to a pressure medium accumulator 12 in a known manner.

The pressure medium pump 1 is driven by a motor/engine which is configured as an electric motor 13 in the exemplary embodiment shown in FIG. 1. According to the invention, it is also possible, however, for the motor/engine, as provided in the exemplary embodiment shown in FIG. 2, to be configured as an internal combustion engine 14.

It is advantageous if it is possible to regulate the power of the pressure medium pump 1 as a function of the power necessary for the hydraulic assistance.

Alternatively, the exemplary embodiment shown in the figures can also be configured on the steering side as a "steer by wire" steering system or as an active frontsteering system (AFS).

The steering moment sensor 10 and optionally also further sensors and the computing unit 11 can preferably be configured with redundancy.

The solenoid valve 2 can be configured with an open hydraulic center (throughflow system) according to FIG. 1 or with a closed hydraulic center (accumulator system) according to FIG. 2. Corresponding advantages result in a known manner from these refinements depending on the type of use.

As is evident from the figures, a clutch 15 is arranged between the pressure medium pump 1 and the internal combustion engine 14 or the electric motor 13. It is thus possible to separate the pressure medium pump 1 from the internal combustion engine 14 or the electric motor 13.

As has been proven in tests, the $CO_2$ emissions and the fuel consumption are reduced as a result. This results from the fact that it is possible to separate the pressure medium pump 1 from the internal combustion engine 14 or the electric motor 13 in driving situations in which no steering movement is necessary, that is to say when no hydraulic assistance is required.

The clutch 15 can be controlled by means of the computing unit 11 and can correspond with the latter for this purpose (cf. the dashed connecting line in the figures).

One refinement of the clutch 15 as an electromagnetic clutch has proven to be particularly suitable for this purpose. The clutch 15 can therefore react quickly and dynamically to changes. Moreover, it is advantageous if the clutch 15, as shown diagrammatically in FIG. 2, is arranged on the pressure medium pump 1 or integrated in the pressure medium pump 1. The clutch 15 can be arranged on the pressure medium pump 1 on or at the pump housing, for example. Arranging the clutch 15 on the pump housing or integrating it into the pressure medium pump 1 can be implemented in a compact and inexpensive manner. An arrangement of the clutch 15 outside the pressure medium pump 1 is shown diagrammatically in FIG. 1.

Furthermore, it is evident from FIG. 2 that a hydraulic accumulator 16, which is appropriate for a solenoid valve 2 with a closed center, can likewise be integrated in the pressure medium pump 1. An advantageous compact arrangement without unnecessary lines or line connections is therefore possible. Sealing problems and complicated installation work are avoided as a result.

In alternative embodiments, it is also possible, if a particularly compact embodiment of the pressure medium pump 1 appears advantageous, for the hydraulic accumulator 16 to be configured to be separate, that is to say not integrated in the pressure medium pump 1.

The exemplary embodiment shown in FIG. 2 (solenoid valve 2 with a closed center) has proven to be particularly suitable with regard to a refinement according to the invention of a power steering system with a clutch. It also appears particularly suitable if the clutch 15 is fastened to the outside of the housing of the pressure medium pump 1. It is possible here to make use of known fastening types, as are known, for example, in practice in air conditioning systems in motor vehicles.

It is possible to ensure a certain steering movement, even if the clutch 15 is open, as a result of the hydraulic accumulator 16 appropriately present in the case of solenoid valves 2 with a closed center. As a result, it is possible to separate the pressure medium pump 1 from the internal combustion engine 14 more frequently, which results in the above-described energetic advantages. A combination of the clutch 15 with the internal combustion engine 14 of the motor vehicle has proven particularly suitable here. It is thus possible to dispense with a separate electric motor.

The pressure in the hydraulic accumulator 16 can be controlled by the clutch 15 in a simple manner. There may be provision here for the clutch 15 to close when a lower pressure level or a lower pressure point is reached in the hydraulic accumulator and thus to charge the hydraulic accumulator 16 again. The clutch 15 can be opened again in an analogous manner when an upper pressure level or an upper pressure point is reached, as a result of which the pressure medium pump 1 is separated from the internal combustion engine 14 or the electric motor 13. The upper pressure point can lie, for example, between 120 and 140 bar, preferably 130 bar, and the lower pressure point can lie 5 to 20 bar, preferably 10 bar, below that. Advantageous pressure regulation or simple and inexpensive control of the pressure medium pump 1 is thus possible. It appears advantageous for the computing unit 11 to control the clutch 15 or sense the pressure and evaluate it.

It is thus possible to control the clutch 15 using the pressure values in the hydraulic accumulator 16.

It goes without saying that the clutch 15 according to the invention can be combined with both types of solenoid valves 2 and with both motor/engine concepts 13, 14.

The centering of the deflected vehicle wheels to the straight ahead driving position can be performed or assisted by an additional logic system. For this purpose, the above-mentioned parameters which the computing unit 11 processes can be used for control.

The solenoid valve 2 can advantageously be arranged, for example, in the cover of the pressure medium pump 1 or in a housing extension. In construction terms, various solutions are possible and can be implemented here.

What I claim is:

1. A power steering system with hydraulic power assistance, comprising a pressure medium pump for producing a hydraulic pressure for power assistance, a solenoid valve for controlling the pressure medium flow to working spaces, the solenoid valve being arranged in the pressure medium pump, a power source for driving the pressure medium pump, and a clutch to separate the pressure medium pump from the power source, said hydraulic accumulator being integrated into the pressure medium pump, and said clutch being controlled using upper and a lower pressure values in the hydraulic accumulator.

2. A power steering system as in claim 1, wherein the power steering system is utilized with motor vehicles.

* * * * *